United States Patent
Nagase et al.

(10) Patent No.: US 8,451,505 B2
(45) Date of Patent: May 28, 2013

(54) IMAGE READING DEVICE, IMAGE READING METHOD, AND IMAGE FORMING APPARATUS FOR CORRECTING DIGITAL IMAGE SIGNAL USING MODULATED REFERENCE SIGNAL

(75) Inventors: Masaki Nagase, Kanagawa (JP); Tohru Kanno, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 639 days.

(21) Appl. No.: 12/719,246

(22) Filed: Mar. 8, 2010

(65) Prior Publication Data

US 2010/0231979 A1  Sep. 16, 2010

(30) Foreign Application Priority Data

Mar. 10, 2009  (JP) ................................. 2009-056140

(51) Int. Cl.
 *G06T 5/00* (2006.01)
(52) U.S. Cl.
 USPC .......... 358/3.26; 358/409; 358/443; 358/463; 358/1.9
(58) Field of Classification Search
 CPC ............. G06T 5/001; G06T 5/002; H04N 1/40
 See application file for complete search history.

(56) References Cited

U.S. PATENT DOCUMENTS

| | | | | |
|---|---|---|---|---|
| 4,128,830 A | * | 12/1978 | Weythman | 382/273 |
| 5,748,800 A | * | 5/1998 | Ueta et al. | 382/266 |
| 7,068,397 B2 | * | 6/2006 | Sugano et al. | 358/409 |
| 7,948,661 B2 | * | 5/2011 | Tsukahara et al. | 358/445 |
| 8,248,669 B2 | * | 8/2012 | Nakazawa | 358/443 |
| 2001/0019428 A1 | * | 9/2001 | Sugano et al. | 358/409 |
| 2006/0152630 A1 | * | 7/2006 | Miyazawa | 348/606 |
| 2008/0106748 A1 | | 5/2008 | Tsukahara et al. | |
| 2009/0059324 A1 | * | 3/2009 | Nagase et al. | 358/513 |
| 2009/0103829 A1 | * | 4/2009 | Takahashi et al. | 382/260 |
| 2009/0213261 A1 | * | 8/2009 | Nagase et al. | 348/312 |

FOREIGN PATENT DOCUMENTS

| JP | 2008-118366 | | 5/2008 |
|---|---|---|---|
| JP | 2012065106 A | * | 3/2012 |

* cited by examiner

*Primary Examiner* — Dung Tran
(74) *Attorney, Agent, or Firm* — Oblon, Spivak, McClelland, Maier & Neustadt, L.L.P.

(57) ABSTRACT

A reference-signal generating unit generates a reference signal for generating a driving signal to drive other units of the image reading device. A frequency modulating unit modulates frequency of the reference signal, thereby generating a frequency-modulated reference signal. A driving-signal generating unit generates the driving signal from the frequency-modulated reference signal. A photoelectric converting unit converts an incident light into an analog image signal using the driving signal. An AD converting unit converts the analog image signal into a digital image signal. A correcting unit corrects the digital image signal by generating a correction signal for eliminating a noise superimposed on the digital image signal using the frequency-modulated reference signal and adding the correction signal to the digital image signal.

8 Claims, 9 Drawing Sheets

Related Art

Related Art

IMAGE READING DEVICE, IMAGE READING METHOD, AND IMAGE FORMING APPARATUS FOR CORRECTING DIGITAL IMAGE SIGNAL USING MODULATED REFERENCE SIGNAL

CROSS-REFERENCE TO RELATED APPLICATIONS

The present application claims priority to and incorporates by reference the entire contents of Japanese Patent Application No. 2009-056140 filed in Japan on Mar. 10, 2009.

BACKGROUND OF THE INVENTION

1. Field of the Invention

The present invention relates to an image reading device that can suppress image-level fluctuation, an image reading method, and an image forming apparatus that includes the image reading device, such as a digital copier, a facsimile machine, and a digital multifunction product.

2. Description of the Related Art

With the demand for high image quality and high running speeds, more and more image reading devices with high pixel density and high running speeds are being used. In a conventional digital copier, signal processing to convert image data that is read by a photoelectric conversion element into a digital image signal is performed, for example, in the following manner.

FIG. 11 is a block diagram of signal processing circuits used in a conventional image reading device. A clock signal coming from an oscillator 101 is converted into a frequency-modulated clock signal by an SSCG circuit 102. The frequency-modulated clock signal is converted into a multiplexed signal by a PLL circuit 103. The multiplexed signal is converted into a CCD driving signal and a signal-processing IC driving signal by a timing generating circuit 104.

A CCD 105, which converts light reflected from an original into an electric signal, is driven according to the frequency-modulated clock received from the timing generating circuit 104 and outputs an analog image signal to an AFE (signal processing IC) 107 via an emitter follower (EF) circuit 106. The AFE 107 includes a clamp circuit 108, a sample/hold (S/H) circuit 109, a programmable gain amplifier (PGA) 110, and an AD converter (ADC) 111.

The AC-coupled analog image signal is clamped to an internal reference potential of the AFE 107 by the clamp circuit 108. The clamped analog image signal is subjected to sampling using a sample pulse, which is a signal-processing IC driving signal, by the S/H circuit 109 so as to maintain its level and thus a continuous analog image signal is generated. The continuous analog image signal is amplified by a predetermined percentage by the PGA 110. The amplified analog image signal is converted into digital data by the ADC 111.

In general, as the pixel density increases or the image reading speed increases, the frequency of the clock according to which the CCD 105 that reads images is driven or the frequency of the clock according to which the AFE 107, which performs various signal processing on the analog image signal received from the CCD 105, is driven increases. The increase in the frequency of the clock increases undesired radiation of electromagnetic waves. To solve the problem, downstream of the oscillator that is used to generate the clock signal, a unit that performs frequency modulation is added (the use of an oscillator that has a frequency modulation function is allowable) to decrease the intensity of the undesired radiation corresponding to the peak of the frequency. This technology is called, herein, "SSCG".

FIG. 12 is a characteristic diagram of a conventional SSCG characteristic. The SSCG is an abbreviation of "spread spectrum clock generator". When a clock signal having the spectrum properties as indicated by S1 of FIG. 12 is subjected to frequency modulation by the SSCG circuit 102, the clock signal is converted into a signal having the spectrum properties indicated by S2 of FIG. 12, in such a case, the intensity of the undesired radiation is lower than that of a clock signal having the spectrum properties as indicated by S1.

However, if the frequency-modulated clock is used in the analog timing generating circuit 104 in the conventional signal processing circuit, because the level of the offset voltage of a waveform output from the CCD 105 fluctuates in synchronization with the frequency modulation of the clock, even when the same density level is read, the level of the image signal periodically fluctuates along one main-scanning line and therefore both a high-level part and a low-level part appear, which causes a problem.

FIG. 13 is a characteristic diagram that explains the relation between frequency and time and the relation between image level and time during frequency modulation as a measure to reduce the undesired radiation. Although, in general, the CCD driving signal is generated using a reference clock that oscillates highly accurately from 50 ppm to 100 ppm if the frequency modulation is performed as a measure to reduce the undesired radiation, the frequency changes with the elapse of time as shown in the graph on the lower portion of FIG. 13, in which the horizontal axis is the time and the vertical axis is the frequency.

More particularly, the frequency increases and decreases smoothly so that a height increased/decreased from the reference frequency does not exceed a predetermined percentage of the reference frequency. The predetermined percentage is, for example, ±0.5% or ±1.0%. Moreover, the frequency has a regular modulating period. As shown in the graph on the lower portion of FIG. 13, the frequency increases by a predetermined height away from the reference frequency in the positive direction, during which the clock period decreases, and then decreases by a predetermined height along the same characteristic curve in the negative direction, during which the clock period increases. The frequency repeats the modulating cycle and then goes back to the reference frequency. Therefore, the frequency becomes the reference frequency at every half period of modulation.

The graph on the upper portion of FIG. 13 illustrates the fluctuation in the image level according to the modulating period. The horizontal axis is time and the vertical axis is the image level. The image level fluctuates in synchronization with the modulating period. Components of the fluctuation appear as noise. FIG. 13 illustrates the fluctuation in the image level along each line. When these lines gather together, the distribution of the low-level parts and the high-level parts appears as undesired fine lines in a read image. The human eye recognizes these undesired lines as moiré patterns. FIG. 14 is a schematic diagram of an image that is obtained by arranging in the sub-scanning direction lines that are subjected to fluctuation in the image level. In an actual output image, parts having a low image level (peak) are dark and parts having a high image level (pit) are light. Therefore, the line between the parts having the low image level and the line between the parts having the high image level appear as stripes.

Japanese Patent Application Laid-open No. 2008-118366 discloses a technology that solves the problem. In the technology, a voltage signal that is synchronized with the frequency modulation of the clock is extracted from the loop filter circuit of the PLL circuit. An analog signal output from the CCD contains noise overlapped therewith that is synchronized with the frequency modulation of the clock. The voltage signal (analog) is applied in the inverse phase to the analog signal output from the CCD so that the noise (components of fluctuation in the image level) is cancelled out.

However, in the technology disclosed in Japanese Patent Application Laid-open No. 2008-118366, because it is necessary to extract the voltage signal that is synchronized with the frequency modulation of a clock generated by the SSCG circuit is weak (several millivolts) and transmit the voltage signal to the analog output unit of the CCD, the waveform may be deformed due to an influence of the noise so that the noise may not be eliminated clearly.

SUMMARY OF THE INVENTION

It is an object of the present invention to at least partially solve the problems in the conventional technology.

According to one aspect of the present invention, there is provided an image reading device including: a reference-signal generating unit that generates a reference signal for generating a driving signal to drive other units of the image reading device; a frequency modulating unit that modulates frequency of the reference signal, thereby generating a frequency-modulated reference signal; a driving-signal generating unit that generates the driving signal from the frequency-modulated reference signal; a photoelectric converting unit that converts an incident light into an analog image signal using the driving signal; an analog-to-digital converting unit that converts the analog image signal into a digital image signal; and a correcting unit that corrects the digital image signal by generating a correction signal for eliminating a noise superimposed on the digital image signal using the frequency-modulated reference signal and adding the correction signal to the digital image signal.

Furthermore, according to another aspect of the present invention, there is provided an image reading method executed in an image reading device. The image reading method includes: generating a reference signal for generating a driving signal to drive other units of the image reading device; modulating frequency of the reference signal, thereby generating a frequency-modulated reference signal; generating the driving signal from the frequency-modulated reference signal; converting an incident light into an analog image signal using the driving signal; converting the analog image signal into a digital image signal; and correcting the digital image signal by generating a correction signal for eliminating a noise superimposed on the digital image signal using the frequency-modulated reference signal and adding the correction signal to the digital image signal.

Moreover, according to still another aspect of the present invention, there is provided an image forming apparatus including an image reading device. The image reading device includes a reference-signal generating unit that generates a reference signal for generating a driving signal to drive other units of the image reading device, a frequency modulating unit that modulates frequency of the reference signal, thereby generating a frequency-modulated reference signal, a driving-signal generating unit that generates the driving signal from the frequency-modulated reference signal, a photoelectric converting unit that converts an incident light into an analog image signal using the driving signal, an analog-to-digital converting unit that converts the analog image signal into a digital image signal, and a correcting unit that corrects the digital image signal by generating a correction signal for eliminating a noise superimposed on the digital image signal using the frequency-modulated reference signal and adding the correction signal to the digital image signal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image reading device, an image reading method, and an image forming apparatus according to the present invention are described in detail below with reference to the accompanying drawings.

Figure 1:
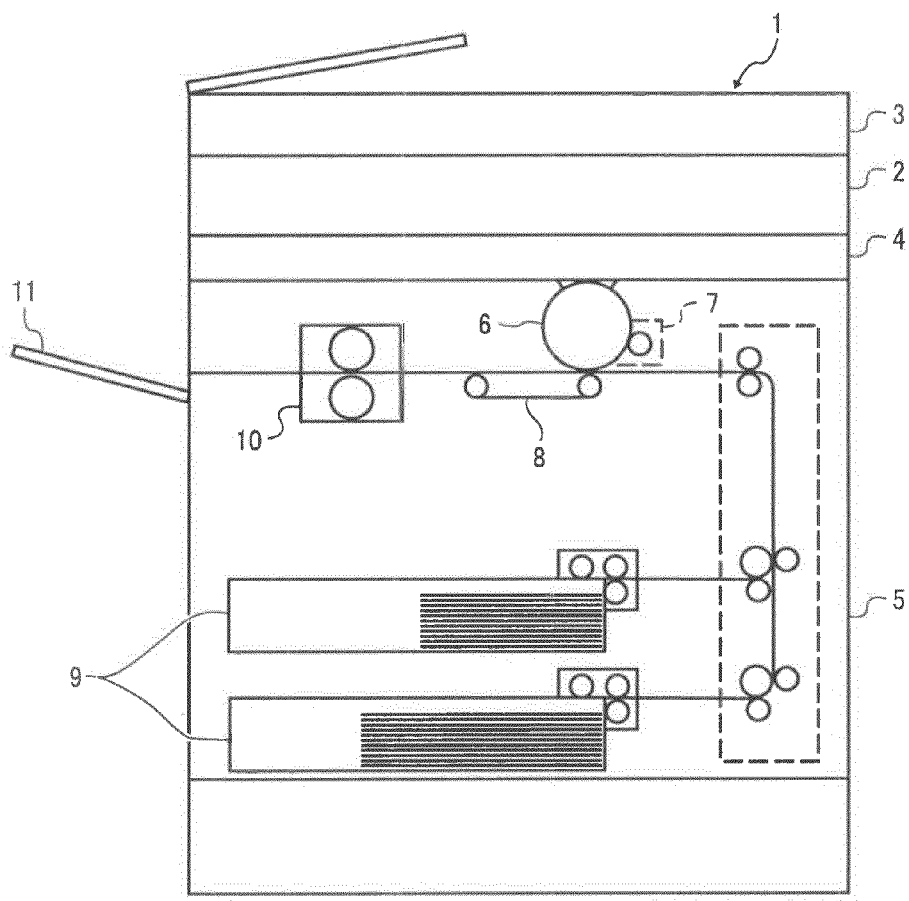
FIG. 1 is a cross-sectional view of the configuration of an image forming apparatus according to a first embodiment of the present invention.

FIG. 1 is a cross-sectional view of the configuration of an image forming apparatus 1 according to a first embodiment of the present invention. The image forming apparatus 1 is, for example, a digital MFP that works as a copier, a printer, a scanner, and a facsimile machine. The image forming apparatus 1 includes an image reading device 2 that reads images. The image forming apparatus 1 can be switched between several modes, such as a copy mode, a printer mode, a scanner mode, and a facsimile mode, by operation of an application switching key of an operation unit (not shown). If the copy mode is selected, the image forming apparatus 1 works as the copier. If the printer mode is selected, the image forming apparatus 1 works as a printer. If the scanner mode is selected, the image forming apparatus 1 works as a scanner. If the facsimile mode is selected, the image forming apparatus 1 works as a facsimile machine.

An image forming process performed by the image forming apparatus 1 is described in brief with reference to FIG. 1. It is assumed that the copy mode is selected. A set of originals is sequentially fed by an automatic document feeder (ADF) 3 to the image reading device 2 and image data is read from the originals by the image reading device (scanner) 2. The read image data is processed by an image processing unit (not shown) and the processed data is converted into optical information by a writing unit 4. After a photosensitive element 6 included in a printer unit 5 is uniformly charged by a charger (not shown), the photosensitive element 6 is exposed to light coming from the writing unit 4 based on the optical information. Thus, an electrostatic latent image is formed on the photosensitive element 6. The electrostatic latent image on the photosensitive element 6 is developed into a toner image by a developing device 7. The toner image is transferred onto a recording sheet coming from a paper-feed cassette 9 being conveyed by a conveyer belt 8. The toner image on the recording sheet is fixed by a fixing device 10 and then discharged onto a discharge tray 11.

Figure 2:
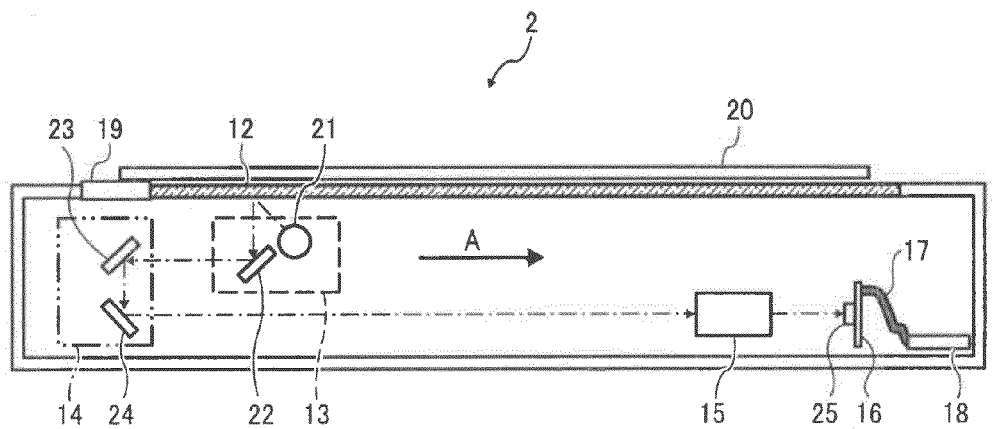
FIG. 2 is a schematic diagram of the configuration of an image reading device.

The image reading device 2 reads an image from the original using a photoelectric conversion element (CCD) and converts an analog image signal into a digital image signal. FIG. 2 is a schematic diagram of the configuration of the image reading device 2. The image reading device 2 includes an exposure glass 12, a first carriage 13, a second carriage 14, a lens unit 15, a sensor board 16, a signal cable 17, an image processing unit 18, and a white reference plate 19.

An original 20 is placed on the exposure glass 12. The first carriage 13 includes a xenon lamp 21 that illuminates the original 20 and a first reflection mirror 22. The second carriage 14 includes a second reflection mirror 23 and a third reflection mirror 24. The first carriage 13 and the second carriage 14 are moved in the sub-scanning direction indicated by A, driven by a stepping motor (not shown) for scanning. An image of the original illuminated by the xenon lamp 21 is sent to the lens unit 15 via the first reflection mirror 22, the second reflection mirror 23, and the third reflection mirror 24. The lens unit 15 forms the received original image on a CCD (CCD linear image sensor) 25.

The sensor board (signal processing circuit unit) 16 generates an analog image signal from the original image read by the CCD 25 and converts the analog image signal into a digital image signal. The sensor board 16 includes signal processing circuits, such as the CCD 25.

Figure 3:
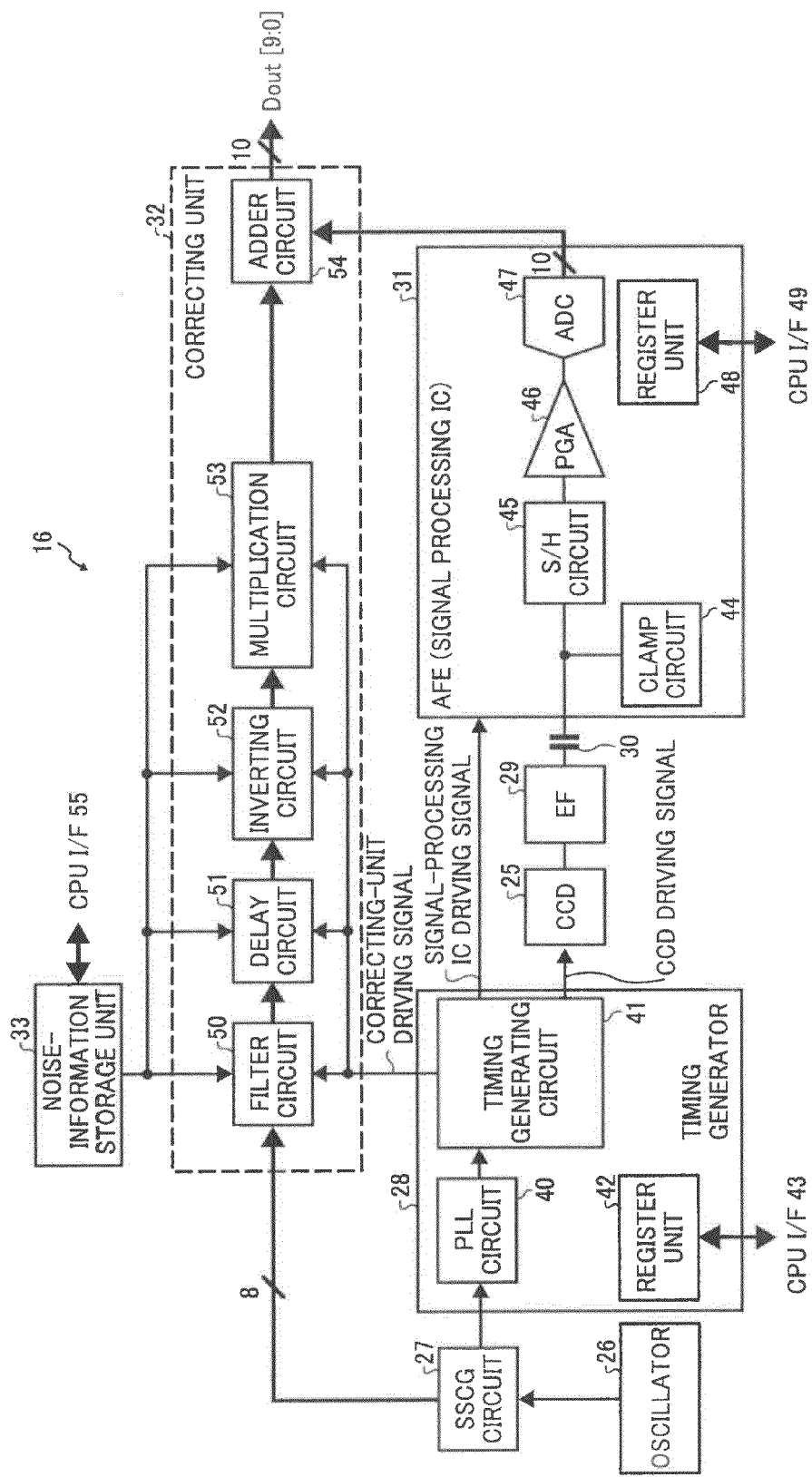
FIG. 3 is a block diagram of signal processing circuits on a sensor board.

FIG. 3 is a block diagram of signal processing circuits on the sensor board 16. The sensor board 16 includes an oscillator 26, an SSCG circuit 27, a timing generator 28, the CCD 25, an EF circuit 29, an AC coupling condenser 30, an AFE (signal processing IC) 31, a correcting unit 32, and a noise-information storage unit 33.

The oscillator 26 is a crystal oscillator and outputs a clock signal (reference signal). The SSCG circuit 27 performs frequency modulation (frequency diffusion) using the clock signal received from the oscillator 26.

Figure 4:
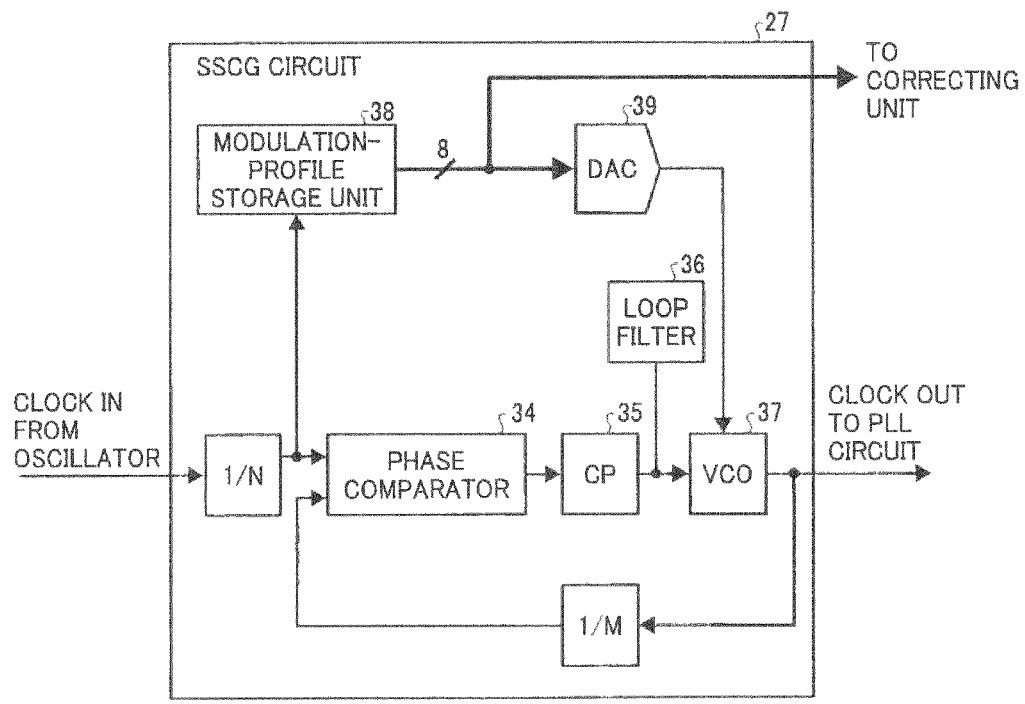
FIG. 4 is a block diagram of the internal configuration of an SSCG circuit.

FIG. 4 is a block diagram of the internal configuration of the SSCG circuit 27. In the same manner as a typical PLL circuit performs, the SSCG circuit 27 performs frequency dividing using the clock signal received from the oscillator 26, compares the phase of the frequency-divided clock signal with the phase of a comparative clock signal (signal obtained by dividing the frequency of a VCO output) using a phase comparator 34, and outputs the current corresponding to the difference between the phases using a charge pump (CP) circuit 35. After that, a loop filter 36 integrates the current, converts the current into a voltage, and cancels noise out. A VCO circuit 37 performs V-F (voltage to frequency) conversion and thus the feedback is implemented.

A modulation-profile storage unit 38 stores therein digital data (modulation profile data) that is used to form a triangle wave. The digital data (modulation profile data) is read sequentially according to the clock signal received from the oscillator 26. The read data is converted into an analog level by a DA converter (DAC) 39. The analog signal is applied to an input voltage of the VCO circuit 37. In this manner, the V-F conversion is performed. The VCO circuit 37 generates a clock signal having the frequency fluctuating according to the modulation profile and outputs the clock signal to a PLL circuit 40. At the same time, the modulation profile data is output to the correcting unit 32.

The timing generator 28 is an IC that includes the PLL circuit 40, a timing generating circuit 41, and a register unit 42. The timing generator 28 generates, using the frequency-modulated clock signal, various clocks of driving signals that drive the CCD 25, the AFE 31, and the correcting unit 32.

The PLL circuit 40 multiplexes the frequency-modulated clock signal to a desired frequency. The timing generating circuit 41 divides the frequency of the multiplexed clock signal, thereby generating clocks of the CCD driving signal that is used to drive the CCD 25, the signal-processing IC driving signal that is used to drive the AFE 31, and the correcting-unit drive signal that is used to drive the correcting unit 32. The CCD driving signal is output to the CCD 25, the signal-processing IC driving signal is output to the AFE 31, and the correcting-unit driving signal is output to the correcting unit 32. The pulse width and the phase of each of the driving clocks are adjustable in the unit of the multiplexed clock of the PLL circuit 40.

The register unit 42 stores therein operational settings and various conditions of the timing generator 28. The setting operation of the register unit 42 is performed when the power is on by an external CPU via a CPU I/F 43. The external CPU is mounted on, for example, the image processing unit 18.

The CCD 25 is a photoelectric conversion element that reads light reflected from the original and converts the light into an electric signal (analog image signal). The EF circuit 29 performs impedance matching between the CCD 25 and the AC coupling condenser 30. The AC coupling condenser 30 decreases the offset voltage so that the voltage of the analog image signal output from the CCD 25 becomes a normal-rated voltage of the AFE 31.

The AFE 31 is a signal processing IC that includes a clamp circuit 44, an S/H circuit 45, a PGA 46, an ADC 47, a register unit 48, and a black-offset correcting circuit (not shown). One of the main functions of the AFE 31 is to convert the received analog image signal into a digital image signal.

The clamp circuit 44 maintains the voltage level of the received analog image signal to a desired fixed level. The S/H circuit 45 samples the analog image signal using a sample pulse, which is a signal-processing IC driving signal, to maintain the level, thereby generating a continuous analog image signal. The PGA 46 amplifies the analog image signal by a predetermined percentage. The ADC 47 converts the analog image signal into a digital image signal. The digital image signal is output to the correcting unit 32.

The register unit 48 stores therein operational settings and various conditions of the AFE 31. The setting operation of the register unit 48 is performed when the power is on by an external CPU via a CPU I/F 49. The external CPU is mounted on, for example, the image processing unit 18. The black-offset correcting circuit sets the level of black, which is used as the reference level of the image signal, to a desired output.

The correcting unit 32 corrects the image data by generating a correction signal and adding the correction signal to the digital image signal so that all the noise that is overlapped with the digital image signal is cancelled out. The correcting unit 32 includes a filter circuit 50, a delay circuit 51, an inverting circuit 52, a multiplication circuit 53, and an adder circuit 54.

Figure 5:
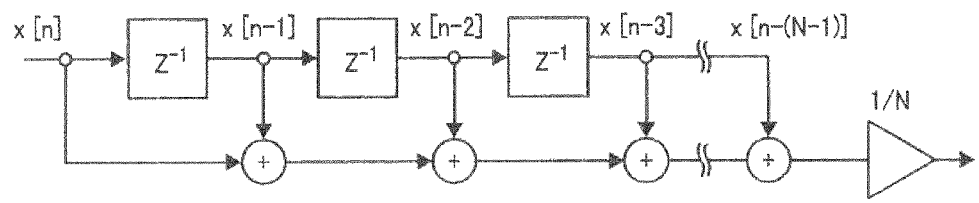
FIG. 5 is a block diagram of the internal configuration of a filter circuit.

The filter circuit 50 converts the modulation profile data into data like data obtained as a result of low-pass filter. FIG. 5 is a block diagram of the internal configuration of the filter circuit 50. The filter circuit 50 includes a digital filter as shown in FIG. 5.

The delay circuit 51 changes an amount of delay of the converted modulation profile data if required. The delay circuit 51 can be formed using multi-step latch circuits or the like in a simple manner. The inverting circuit 52 inverts the phase of the converted modulation profile data 180° if required. The multiplication circuit 53, if required, performs multiplication to amplify or attenuate the amplitude of the converted modulation profile data so that the amplitude becomes comparable to the amplitude of the noise that is overlapped with the image data output from the CCD 25.

The adder circuit 54 determines the modulation profile data that has been subjected to the processes performed by the filter circuit 50, the delay circuit 51, the inverting circuit 52, and the multiplication circuit 53 as the correction signal and adds the correction signal to the digital image data that is received from the AFE 31. The method of correcting the image data by the correcting unit 32 will be described in detail later.

The noise-information storage unit 33 stores therein operational states of the filter circuit 50, the delay circuit 51, the inverting circuit 52, and the multiplication circuit 53. When the power is on, the optimum operational states are read from the noise-information storage unit 33 and loaded on the filter circuit 50, the delay circuit 51, the inverting circuit 52, and the multiplication circuit 53. The optimum operational states are adjusted states that are set, in a process of manufacturing the image reading device 2, the polarity, the phase, the amplitude, etc. of the noise correction signal in such a manner that the amplitude of noise in the image data in the darkness has the minimum value.

An external CPU can change the operational states stored in the noise-information storage unit 33 if required via a CPU I/F 55; therefore, if some parts are replaced for repair or if behavior of the noise changes with the elapse of time, the operational states can be updated. The external CPU is mounted on, for example, the image processing unit 18.

The signal cable 17 transmits the digital image signal that has been converted by the sensor board 16 to the image processing unit 18. The image processing unit 18 performs shading correction on the image data that has been converted into the digital signal, in which unevenness in the sensitivity of the CCD 25 and unevenness in light distribution are corrected using another image data that is obtained by the CCD 25 reading the illumination light of the xenon lamp 21 reflected from the white reference plate 19, and some other digital processing, such as γ correction. The white reference plate 19 is used to correct various distortions caused by, for example, the scanning optical system as described above.

A process of converting the analog image signal output from the CCD 25 into the digital image signal and performing various processes on the digital image signal is described in brief below. The analog image signal is output from the CCD 25 in synchronization with the CCD driving signal. The analog image signal is AC-coupled by the AC coupling condenser 30 via the EF circuit 29. The offset potential of the AC-coupled signal is converted into a direct current by the clamp circuit 44. After that, the voltage level of the image signal is sampled and held by the S/H circuit 45 according to a signal-processing IC driving signal received from an external device so that the analog image signal is converted into the image signal having the continuous signal level (the reset noise or the like in the CCD 25 is canceled out).

The offset level of the output from the CCD 25 (the level of the image signal in the darkness) is applied with an appropriate analog offset in the black-offset correcting circuit (not shown) to prevent the negative saturation of the analog image signal. After that, the PGA 46 amplifies the analog image signal so that the voltage of the analog image signal is increased to a predetermined level. The amplified signal is converted into a 10-bit digital image data by the ADC 47.

The 10-bit digital image data that is obtained in this manner is transmitted to the image processing unit 18 via the signal cable 17. The 10-bit digital image data is subjected in the image processing unit 18 to shading correction, in which unevenness in the sensitivity of the CCD 25 and unevenness in the light distribution are corrected using the image data that is obtained by the CCD 25 reading the illumination light of the xenon lamp 21 reflected from the white reference plate 19, and some other digital processing, such as γ correction.

(Method of Correcting Image Data)

Figure 6:
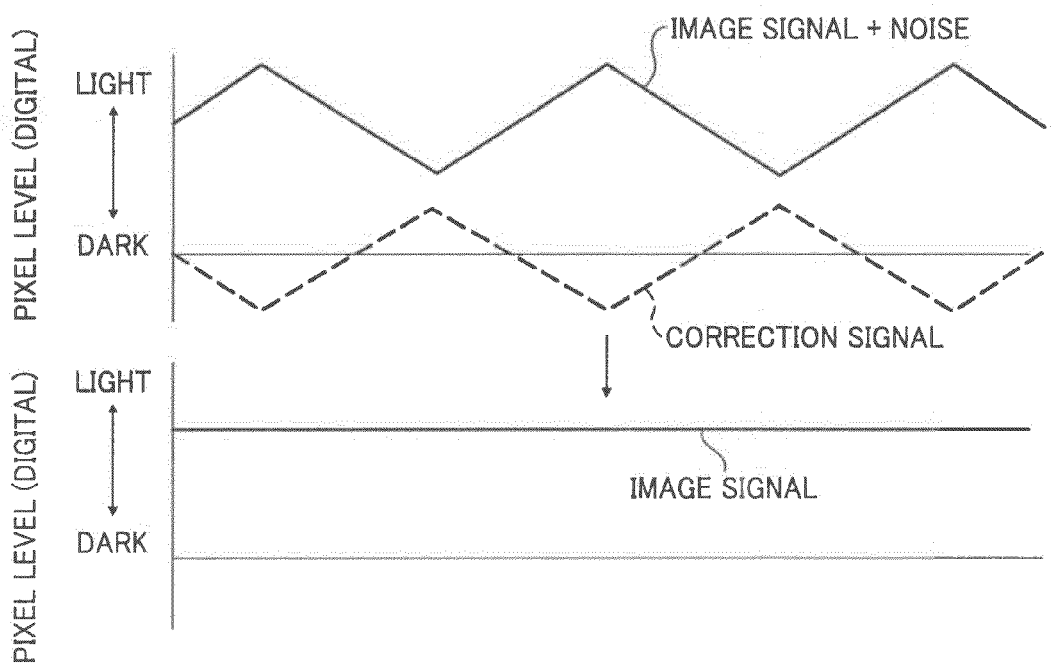
FIG. 6 is graphs that explain a method of cancelling out noise from digital image with which the noise is overlapped.

The method of correcting the image data performed by the correcting unit 32 is described below. FIG. 6 is graphs that explain a method of cancelling out noise from the digital image data with which the noise is overlapped. The continuous line in the graph on the upper portion of FIG. 6 is the image signal (analog) output from the CCD 25 in the form of digital data that has been converted by the ADC 47 in the darkness. It is clear from the graph that because the CCD driving signal is subjected to the frequency modulation by the SSCG circuit 27, the noise according to the modulating period is overlapped with the original image signal read by the CCD 25.

An object of the present invention is to cancel noise out by extracting the triangle wave data of the modulation profile (modulation profile data) indicated by the dashed line in the graph on the upper portion of FIG. 6 from the SSCG circuit 27, determining the modulation profile data as the correction signal, and adding the correction signal to the image signal in such a manner that the phase of the modulation profile data is inverse to the phase of the noise. The continuous line in the graph on the lower portion of FIG. 6 is a clear image signal after the noise cancellation.

However, if the PLL circuit 40 is present downstream of the SSCG circuit 27 as shown in FIG. 3, because of the effects of the frequency properties of the loop filter in the PLL circuit 40, the clock modulation, which operates according to the profile of the triangle wave, is deformed to a slightly blunt profile. Due to this, the shape of the noise that is overlapped with the image signal output from the CCD 25 is deformed to a blunt shape.

Figure 7:
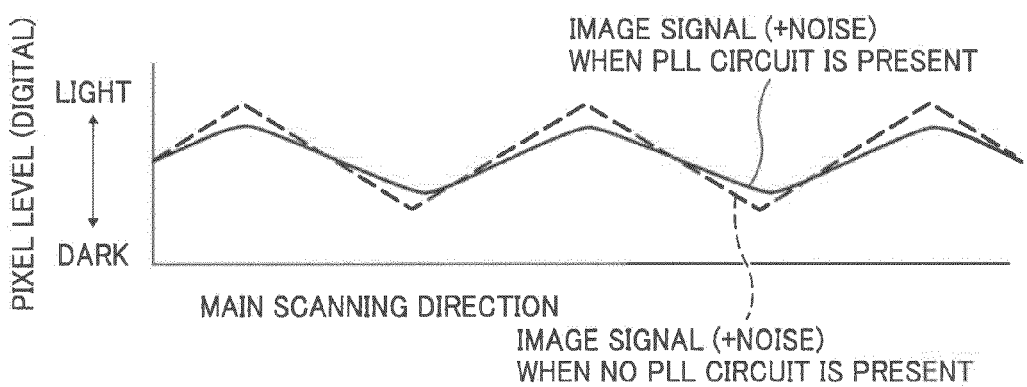
FIG. 7 is a graph that explains a change in an image signal output from a CCD.

As a result, the image signal output from the CCD 25 slightly changes depending on whether the PLL circuit 40 is present. FIG. 7 is a graph that explains a change in the image signal output from the CCD 25. The dashed line in FIG. 7 is the image signal output from the CCD 25 when the PLL circuit 40 is not present downstream of the SSCG circuit 27. The continuous line in FIG. 7 is the image signal output from the CCD 25 when the PLL circuit 40 is present downstream of the SSCG circuit 27. It is clear that, because the shape of the noise overlapped with the image signal indicated by the dashed line is different from the shape of the noise overlapped with the image signal indicated by the continuous line, the shapes of these image signals are slightly different from each other.

Figure 8:
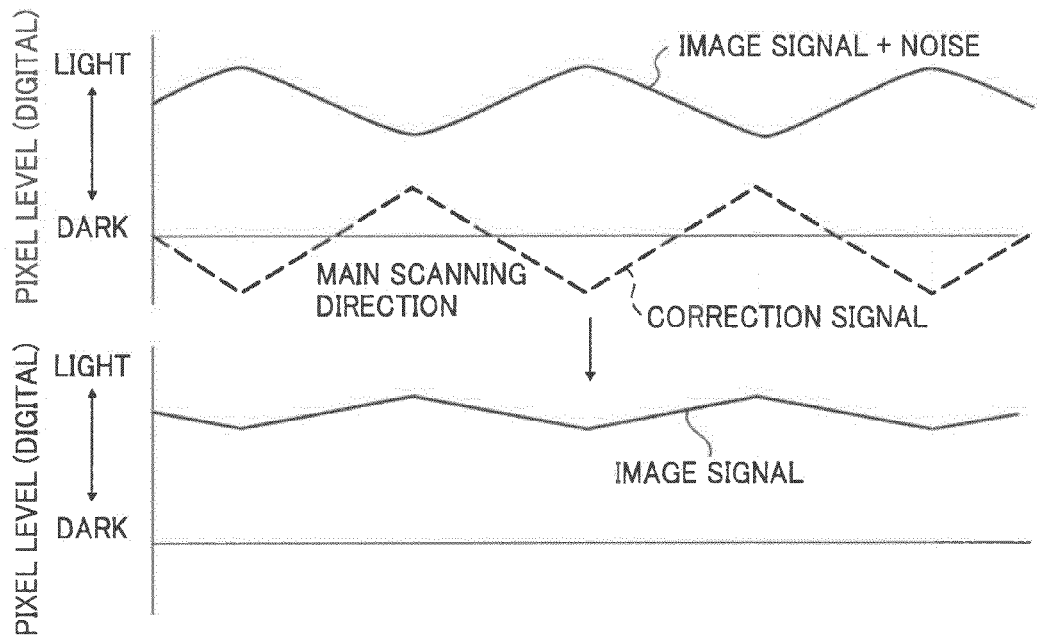
FIG. 8 is a graph of an image signal that is obtained by adding a correction signal to the image signal output from the CCD when a PLL circuit is present downstream of the SSCG circuit.

FIG. 8 is a graph of an image signal that is obtained by adding the correction signal to the image signal output from the CCD 25 when the PLL circuit 40 is present downstream of the SSCG circuit 27. As shown in FIG. 8, even if the correction signal is applied to the image signal, because the phase and the amplitude of the correction signal are different from those of the image signal, all the noise cannot be canceled out, i.e., the correction is not sufficient. To address the problem, the correcting unit 32 performs the following process to cancel all the noise out, thereby generating a clear image data.

The filter circuit 50 converts the modulation profile data, which is received from the modulation-profile storage unit 38, into data like data obtained as a result of low-pass filter. As described above, the filter circuit 50 includes the digital filter. The number of pixels that are used to form the digital filter is adjusted according to an amount of the noise overlapped with the actual output of the CCD 25.

Therefore, even if the actual clock modulation is deformed to a slightly blunt triangle wave due to the effects of the frequency properties of the loop filter in the PLL circuit 40 and the shape of the noise overlapped with the image data output from the CCD 25 is deformed according to the slightly blunt triangle wave, the state of the correction signal can come close to the actual modulation state (state adjusted according to the phase shift caused by the loop filter in the PLL circuit 40) by calculating the correction signal using the digital filter having the frequency properties close to the loop filter in the PLL circuit 40. This makes it possible to implement the noise cancellation.

The delay circuit 51 changes an amount of delay of the modulation profile data that has been converted by the filter circuit 50 using information received from the noise-information storage unit 33 (i.e., shifts the phase). More particularly, the delay circuit 51 adjusts the phase of the correction signal according to the noise so that the phase becomes close to the actual modulation state (the state adjusted according to the phase shift caused by the loop filter of the PLL circuit 40). With this configuration, clear cancellation of the noise is implemented. The amount of delay is adjusted as appropriately according to the amount of the noise overlapped with the actual output of the CCD 25.

The inverting circuit 52 inverts, if required, the phase of the modulation profile data that has been delayed by the delay circuit 51 180° using the information received from the noise-information storage unit 33. This is because whether the relation between the phase of the noise overlapped with the image data output from the CCD 25 and the phase of the waveform of the modulation profile data is positive or negative depends on the type of the CCD 25. The inverting circuit 52 inverts the phase 180° or remains the phase as it is so that the phase of the correction signal becomes invert to the phase of the noise. With this configuration, noise cancellation is implemented.

The multiplication circuit 53 performs, using the information received from the noise-information storage unit 33, multiplication to amplify or attenuate the amplitude of the modulation profile data received from the inverting circuit 52 so that the amplitude becomes comparable to the amplitude of the noise overlapped with the image data output from the CCD 25. More particularly, the multiplication circuit 53 causes the amplitude of the correction signal comparable to the amplitude of the digital image signal. With this configuration, noise cancellation is implemented.

Figure 9:
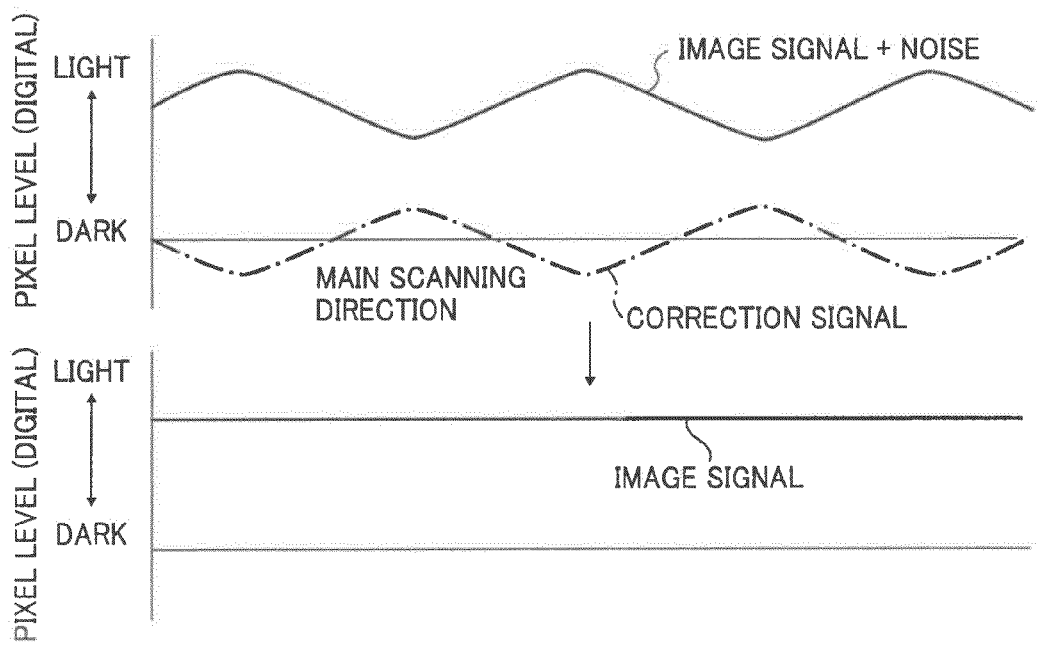
FIG. 9 is graphs that explain that a correction signal generated by a correcting unit cancels out all the noise that is overlapped with the image data.

The adder circuit 54 determines the modulation profile data that has been processed in the above manner as the correction signal and adds the correction signal to the digital image data of the CCD 25 received from the AFE 31. FIG. 9 is graphs that explain that the correction signal generated by the correcting unit 32 cancels out all the noise that is overlapped with the image data. As shown in FIG. 9, the correction signal generated by the correcting unit 32 has the waveform with the amplitude the same as and the phase 180° inverse to the amplitude and the phase of the noise overlapped with the image data output from the CCD 25; therefore, the correction signal can cancel out all the noise in the digital image signal and clear image data is generated.

In the present embodiment, the modulation profile data is subjected to various processes, such as the converting process by the filter circuit 50, the delay process by the delay circuit 51, the inverting process by the inverting circuit 52, and the multiplexing process by the multiplication circuit 53 in the order appearing in this sentence. The order of these processes can be changed.

As described above, the image reading device according to the first embodiment generates the correction signal using the reference signal that has been modulated by the SSCG circuit and adds the correction signal to the digital signal so that all the noise in the image signal is cancelled out. With this configuration, no moiré patterns appear on the output image.

In an image reading device according to a second embodiment of the present invention, a 3-line sensor for red, green and blue is used as a CCD. The second embodiment is described below with reference to the accompanying drawings. Only parts of the image reading device according to the present embodiment different from the image reading device according to the first embodiment are described. The other parts that are the same as those in the first embodiment are denoted with the same reference numerals and the same description is not repeated.

Figure 10:
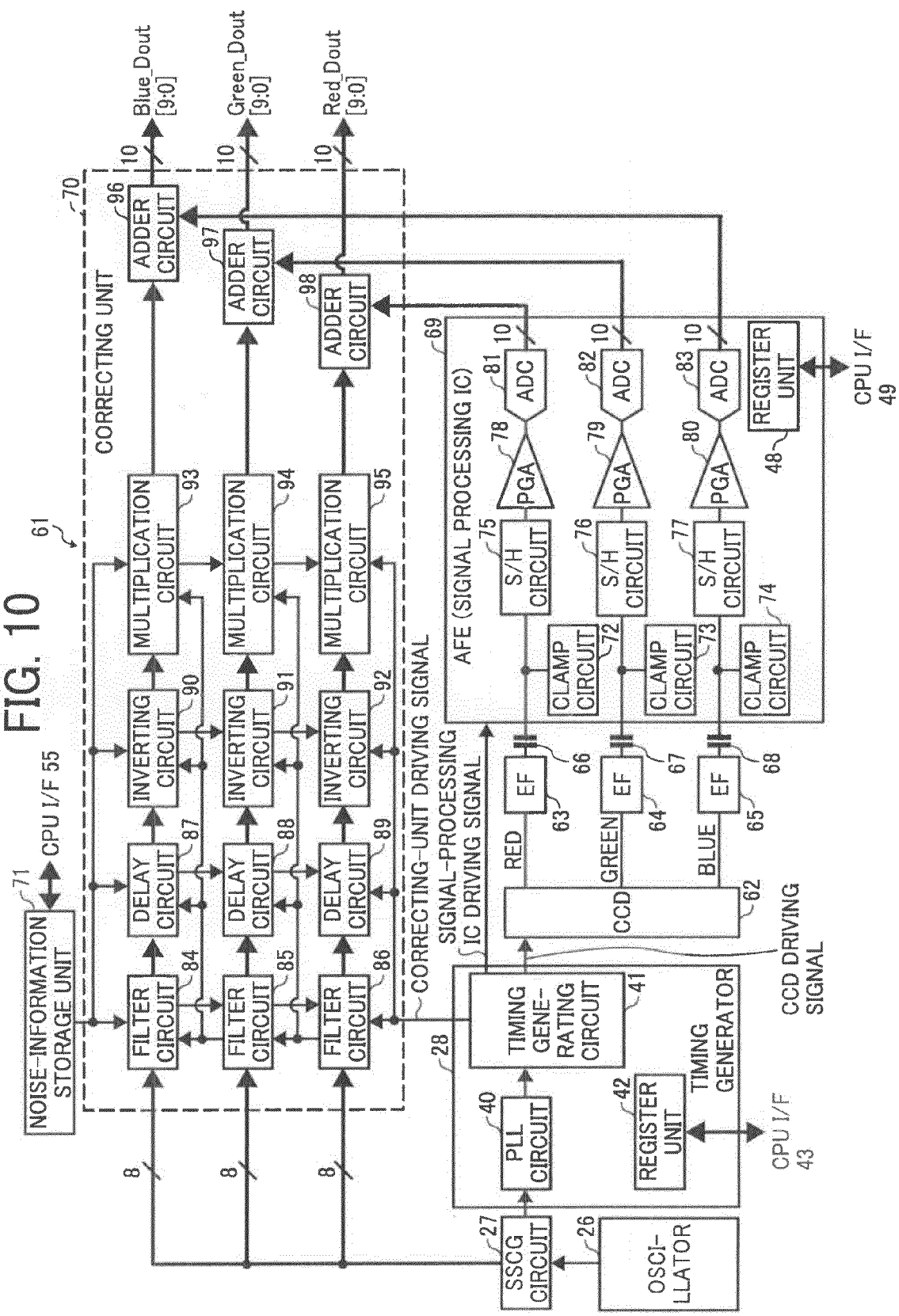
FIG. 10 is a block diagram of signal processing circuits on a sensor board according to a second embodiment of the present invention.
Figure 11:
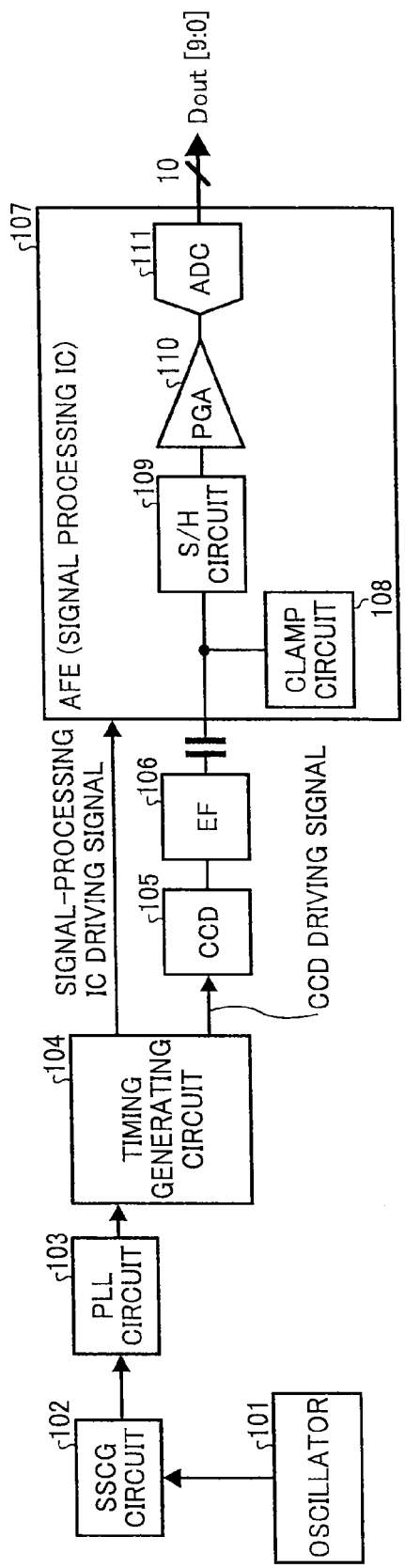
FIG. 11 is a block diagram of signal processing circuits used in a conventional image reading device.
Figure 12:
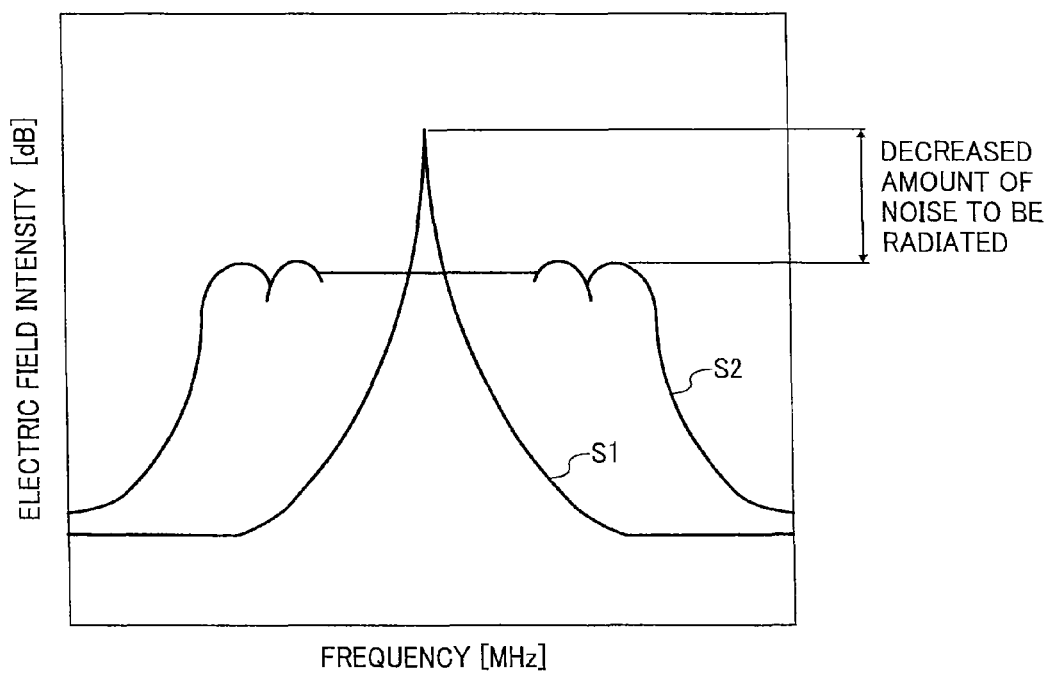
FIG. 12 is a characteristic diagram of a conventional SSCG characteristic.
Figure 13:
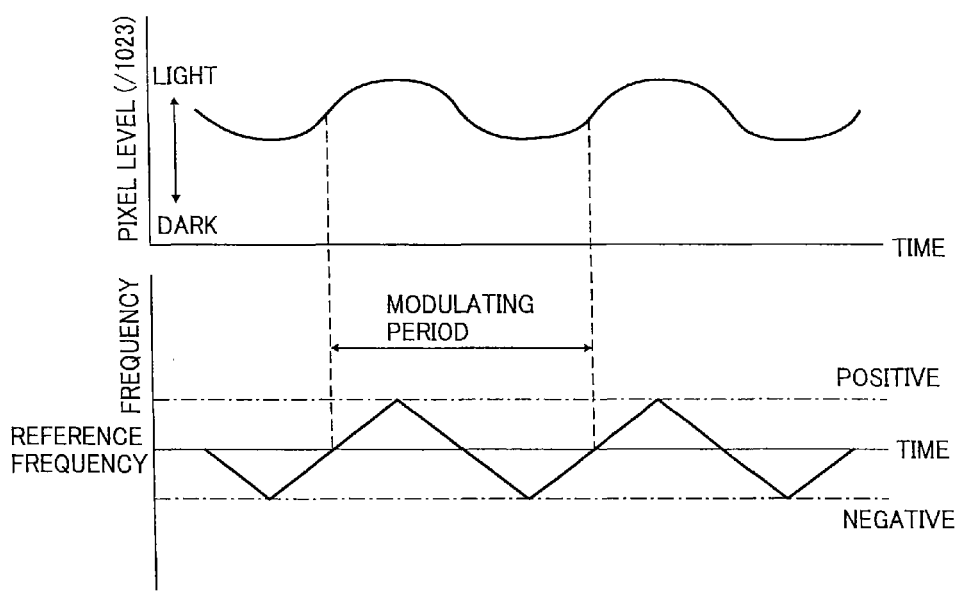
FIG. 13 is a characteristic diagram that explains the relation between frequency and time and the relation between image level and time during frequency modulation as a measure to reduce undesired radiation.
Figure 14:
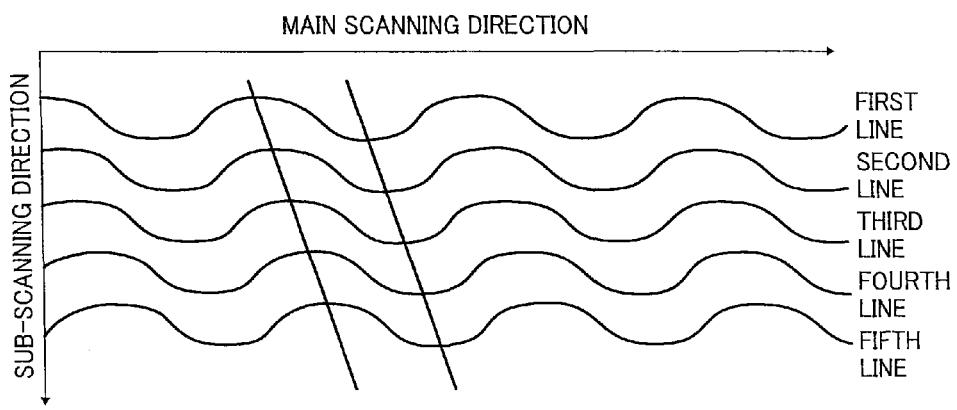
FIG. 14 is a schematic diagram of an image that is obtained by arranging in the sub-scanning direction lines that are subjected to fluctuation in the image level.

The image reading device according to the second embodiment is different from the image reading device according to the first embodiment only in signal processing circuits on a sensor board. FIG. 10 is a block diagram of signal processing circuits on a sensor board 61 according to the second embodiment. The sensor board (signal processing circuit) 61 includes the oscillator 26, the SSCG circuit 27, the timing generator 28, a CCD 62, EF circuits 63, 64, and 65, AC coupling condensers 66, 67, and 68, an AFE 69, a correcting unit 70, and a noise-information storage unit 71.

The timing generator 28 is an IC that includes the PLL circuit 40, the timing generating circuit 41, and the register unit 42.

The CCD 62 reads light reflected from the original and converts the light into an electric signal (analog image signal). The CCD 62 is a 3-line CCD for high resolution. The CCD 62 includes one channel with a series of pixels corresponding to each of red, green blue. The CCD 62 output an electric signal that is converted by each series of the pixels. More particularly, the CCD 62 resolves the read light into red, green, and blue and converts each of the resolved lights into an analog image signal.

The EF circuit 63 performs impedance matching between a red output unit of the CCD 62 and the AC coupling condenser 66. The EF circuit 64 performs impedance matching between a green output unit of the CCD 62 and the AC coupling condenser 67. The EF circuit 65 performs impedance matching between a blue output unit of the CCD 62 and the AC coupling condenser 68.

The AC coupling condenser 66 decreases the offset voltage so that the voltage of the analog image signal output from the red output unit of the CCD 62 becomes a normal-rated voltage of the AFE 69. The AC coupling condenser 67 decreases the offset voltage so that the voltage of the analog image signal output from the green output unit of the CCD 62 becomes a normal-rated voltage of the AFE 69. The AC coupling condenser 68 decreases the offset voltage so that the voltage of the analog image signal output from the blue output unit of the CCD 62 becomes a normal-rated voltage of the AFE 69.

The AFE 69 is a signal processing IC that includes clamp circuits 72, 73, and 74, S/H circuits 75, 76, and 77, PGAs 78, 79, and 80, ADCs 81, 82, and 83, the register unit 48, and a black-offset correcting circuit (not shown). One of the main functions of the AFE 69 is to convert each of the received red, green, and blue analog image signals into a digital image signal.

The clamp circuit 72 maintains the voltage level of the received red analog image signal to a desired fixed level. The clamp circuit 73 maintains the voltage level of the received green analog image signal to a desired fixed level. The clamp circuit 74 maintains the voltage level of the received blue analog image signal to a desired fixed level.

The S/H circuit 75 samples the red analog image signal using a sample pulse, which is a signal-processing IC driving signal, to maintain the level, thereby generating a continuous analog image signal. The S/H circuit 76 samples the green analog image signal using a sample pulse, which is a signal-processing IC driving signal, to maintain the level, thereby generating a continuous analog image signal. The S/H circuit 77 samples the blue analog image signal using a sample pulse, which is a signal-processing IC driving signal, to maintain the level, thereby generating a continuous analog image signal.

The PGA 78 amplifies the red analog image signal by a predetermined percentage. The PGA 79 amplifies the green analog image signal by a predetermined percentage. The PGA 80 amplifies the blue analog image signal by a predetermined percentage.

The ADC 81 converts the red analog image signal into a red digital image signal. The red digital image signal is output to the correcting unit 70. The ADC 82 converts the green analog image signal into a green digital image signal. The green digital image signal is output to the correcting unit 70. The ADC 83 converts the blue analog image signal into a blue digital image signal. The blue digital image signal is output to the correcting unit 70.

The correcting unit 70 generates correction signals and adds each correction signal to the corresponding digital image signal, which is one of the red digital image signal, the green digital image signal, and the blue digital image signal, so that all the noise that is overlapped with each digital image signal is canceled out. In this manner, the correcting unit 70 corrects each of the red image data, the green image data, and the blue image data. The correcting unit 70 includes filter circuits 84, 85, and 86, delay circuits 87, 88, and 89, inverting circuits 90, 91, and 92, multiplication circuits 93, 94, and 95, and adder circuits 96, 97, and 98.

The filter circuit 84 converts modulation profile data that is used for the red image data (hereinafter, "red modulation profile data") into such data as data obtained as a result of low-pass filter. The filter circuit 85 converts modulation profile data that is used for the green image data (hereinafter, "green modulation profile data") into such data as data obtained as a result of low-pass filter. The filter circuit 86 converts modulation profile data that is used for the blue image data (hereinafter, "blue modulation profile data") into data like data obtained as a result of low-pass filter.

The delay circuit 87 changes an amount of delay of the converted red modulation profile data if required. The delay circuit 88 changes an amount of delay of the converted green modulation profile data if required. The delay circuit 89 changes an amount of delay of the converted blue modulation profile data if required.

The inverting circuit 90 inverts the phase of the converted red modulation profile data 180° if required. The inverting circuit 91 inverts the phase of the converted green modulation profile data 180° if required. The inverting circuit 92 inverts the phase of the converted blue modulation profile data 180° if required.

The multiplication circuit 93, if required, performs multiplication to amplify or attenuate the amplitude of the converted red modulation profile data so that the amplitude becomes comparable to the amplitude of the noise that is overlapped with the red image data output from the CCD 62. The multiplication circuit 94, if required, performs multiplication to amplify or attenuate the amplitude of the converted green modulation profile data so that the amplitude becomes comparable to the amplitude of the noise that is overlapped with the green image data output from the CCD 62. The multiplication circuit 95, if required, performs multiplication to amplify or attenuate the amplitude of the converted blue modulation profile data so that the amplitude becomes comparable to the amplitude of the noise that is overlapped with the blue image data output from the CCD 62.

The adder circuit 96 determines the red modulation profile data that has been subjected to the processes performed by the filter circuit 84, the delay circuit 87, the inverting circuit 90, and the multiplication circuit 93 as the correction signal and adds the correction signal to the red digital image data that is received from the AFE 69. The adder circuit 97 determines the green modulation profile data that has been subjected to the processes performed by the filter circuit 85, the delay circuit 88, the inverting circuit 91, and the multiplication circuit 94 as the correction signal and adds the correction signal to the green digital image data that is received from the AFE 69. The adder circuit 98 determines the blue modulation profile data that has been subjected to the processes performed by the filter circuit 86, the delay circuit 89, the inverting circuit 92, and the multiplication circuit 95 as the correction signal and adds the correction signal to the blue digital image data that is received from the AFE 69.

The method of correcting the image data performed by the correcting unit 70 is the same as the method performed by the correcting unit 32 according to the first embodiment and the same description is not repeated.

The noise-information storage unit 71 stores therein operational states of the filter circuits 84, 85, and 86, the delay circuits 87, 88, and 89, the inverting circuits 90, 91, and 92, and the multiplication circuits 93, 94, and 95. The operational states in the red output line, the green output line, and the blue output line vary depending on the output line. When the power is on, the optimum operational states are read from the noise-information storage unit 71 and loaded on the filter circuits 84, 85, and 86, the delay circuits 87, 88, and 89, the inverting circuits 90, 91, and 92, and the multiplication circuits 93, 94, and 95. The optimum operational states are adjusted states that are set, in a process of manufacturing the image reading device, the polarity, the phase, the amplitude, etc. of the noise correction signal in such a manner that the amplitude of noise in the image data in the darkness has the minimum value.

An external CPU can change the operational states stored in the noise-information storage unit 71 if required via the CPU I/F 55; therefore, if some parts are replaced for repair or if behavior of the noise changes with the elapse of time, the operational states can be updated. The external CPU is mounted on, for example, the image processing unit 18.

As described above, each color-based analog image data that has been converted by the CCD 62 is converted into digital image data in parallel. The correcting of each color-based digital image data is performed in parallel. The correcting unit 70 can individually adjust the phase and the amplitude of each correction signal to be added to the corresponding color-based digital image data; therefore, even if the phase and the amplitude of the noise overlapped with the image data vary depending on the color, all the noise in each of the color-based image data is cancelled out.

The image reading device according to the second embodiment generates the color-based correction signals using the reference signal that has been modulated by the SSCG circuit and adds each of the correction signals to the corresponding color-based digital signal so that all the noise in each of the color-based digital image signals is cancelled out. With this configuration, no moiré patterns appear on the output image.

The PLL circuit is present in the timing generator that is downstream of the SSCG circuit in the above embodiments. However, the technology disclosed in the present invention is effective even a case where, although the timing generator includes no PLL circuit, the clock modulation according to the triangle wave profile is deformed to a slightly blunt profile due to the effects of the frequency properties of a loop filter of another circuit equipped with the timing generator.

Although the image forming apparatus according to the above embodiments is an MFP that has as at least two functions from among a copy function, a printer function, a scanner function, and a facsimile function, some other image forming apparatuses, such as a copier, a printer, a scanner, and a facsimile machine, can be used.

According to one aspect of the present invention, because all the noise superimposed on the image signal can be eliminated by generating the correction signal using the reference signal that has been modulated by the SSCG circuit and adding the correction signal to the digital signal, the moiré patterns appear on the output image can be prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading device comprising:
   a reference-signal generating unit that generates a reference signal for generating a driving signal to drive other units of the image reading device;
   a frequency modulating unit that modulates frequency of the reference signal, thereby generating a frequency-modulated reference signal;
   a driving-signal generating unit that generates the driving signal from the frequency-modulated reference signal;
   a photoelectric converting unit that converts an incident light into an analog image signal using the driving signal;
   an analog-to-digital converting unit that converts the analog image signal into a digital image signal; and
   a correcting unit that corrects the digital image signal by generating a correction signal for eliminating a noise superimposed on the digital image signal using the frequency-modulated reference signal and adding the correction signal to the digital image signal.

2. The image reading device according to claim 1, wherein the correcting unit includes a filter unit that adjusts phase and amplitude of the frequency-modulated reference signal.

3. The image reading device according to claim 1, wherein the correcting unit includes a delay unit that delays phase of the frequency-modulated reference signal.

4. The image reading device according to claim 1, wherein the correcting unit includes an inverting unit that inverts phase of the frequency-modulated reference signal by 180 degrees.

5. The image reading device according to claim 1, wherein the correcting unit includes a multiplication circuit that performs a multiplication to amplify or attenuate amplitude of the frequency-modulated reference signal so that the amplitude of the frequency-modulated reference signal becomes comparable to amplitude of the noise.

6. The image reading device according to claim 1, wherein
   the photoelectric conversion unit resolves the incident light into a plurality of colors and converts resolved lights into analog image signals of different colors,
   the analog-to-digital converting unit converts each of the analog image signals of different colors into the digital image signal for each of the colors, and
   the correcting unit corrects the digital image signal for each of the colors by generating the correction signal for each of the colors using the frequency-modulated reference signal and adding the correction signal to the digital image signal of a corresponding color.

7. An image reading method executed in an image reading device, comprising:
   generating a reference signal for generating a driving signal to drive other units of the image reading device;
   modulating frequency of the reference signal, thereby generating a frequency-modulated reference signal;
   generating the driving signal from the frequency-modulated reference signal;
   converting an incident light into an analog image signal using the driving signal;
   converting the analog image signal into a digital image signal; and
   correcting the digital image signal by generating a correction signal for eliminating a noise superimposed on the digital image signal using the frequency-modulated reference signal and adding the correction signal to the digital image signal.

8. An image forming apparatus comprising an image reading device that includes
   a reference-signal generating unit that generates a reference signal for generating a driving signal to drive other units of the image reading device,
   a frequency modulating unit that modulates frequency of the reference signal, thereby generating a frequency-modulated reference signal,
   a driving-signal generating unit that generates the driving signal from the frequency-modulated reference signal,
   a photoelectric converting unit that converts an incident light into an analog image signal using the driving signal,
   an analog-to-digital converting unit that converts the analog image signal into a digital image signal, and
   a correcting unit that corrects the digital image signal by generating a correction signal for eliminating a noise superimposed on the digital image signal using the frequency-modulated reference signal and adding the correction signal to the digital image signal.

* * * * *